United States Patent
Yonetsuka et al.

(10) Patent No.: US 6,434,142 B1
(45) Date of Patent: Aug. 13, 2002

(54) COMMUNICATION SYSTEM CAPABLE OF AUTOMATICALLY SWITCHING SPEECH PATH VIA LOCAL AREA NETWORK TO SPEECH PATH VIA SPEECH NETWORK

(75) Inventors: Nobuo Yonetsuka; Syouji Kameno, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/321,102

(22) Filed: May 27, 1999

(30) Foreign Application Priority Data

May 29, 1998 (JP) .......................................... 10-164390

(51) Int. Cl.[7] .............................................. H04L 12/66
(52) U.S. Cl. ........................................ 370/354; 370/352
(58) Field of Search ................................. 370/351, 352, 370/354, 355, 356, 401

(56) References Cited

U.S. PATENT DOCUMENTS

| | | | | |
|---|---|---|---|---|
| 5,732,078 A | * | 3/1998 | Arango | 370/352 |
| 6,298,043 B1 | * | 3/1998 | Mauger et al. | 370/248 |
| 5,991,310 A | * | 11/1999 | Katko | 370/552 |

FOREIGN PATENT DOCUMENTS

JP          5-56047         3/1993

* cited by examiner

Primary Examiner—Melvin Marcelo
Assistant Examiner—Ron Abelson
(74) Attorney, Agent, or Firm—Foley & Lardner

(57) ABSTRACT

In a communication system including a local area network (LAN), first and second LAN telephone gateways connected to the LAN, a speech network, first and second private branch exchanges (PBXs) connected to the speech network and to the first and second LAN telephone gateways, respectively, and first and second telephone sets connected to the first and second PBXs, respectively, a first speech path is realized from the first telephone set via the first PBX to the first LAN telephone gateway. Then, it is determined whether a second speech path from the first LAN telephone gateway via the LAN, the second LAN telephone network and the second PBX to the second telephone set is possible or impossible. Then, after the second speech path is determined to be possible, the second speech path is realized. After the second speech path is determined to be impossible, a third speech path is realized from the first LAN telephone gateway via the first PBX, the speech network and the second PBX to the second telephone set. When the third speech path is realized, it is determined whether or not a fourth speech path from the first LAN-telephone gateway via the LAN and the second LAN telephone gateway to the second PBX is possible. If the fourth speech path is determined to be possible, the fourth speech path, is realized, and a part of the third speech path from the first LAN telephone gateway via the first PBX and the speech network to the second PBX is disconnected.

9 Claims, 5 Drawing Sheets

COMMUNICATION SYSTEM CAPABLE OF AUTOMATICALLY SWITCHING SPEECH PATH VIA LOCAL AREA NETWORK TO SPEECH PATH VIA SPEECH NETWORK

BACKGROUND OF THE INVENTION

1. Field of the Invention

The present invention relates to a communication system including a local area network (LAN) and a speech network.

2. Description of the Related Art

In a prior art communication system, including a LAN and a speech network the LAN is connected to LAN telephone gateways, and the speech network is connected to private branch exchanges (PBXs) which are connected to telephone sets. Also, the PBXx are connected to the respective ones of the LAN telephone gateways. Therefore, a call connection between two of the telephone sets can be carried out by using one speech path (connection route) using the LAN or one speech path using the speech network.

Generally, a speech path using the LAN requires a low charge, while a speech path using the speech network requires a high charge. Therefore, when a call connection is required between two telephone sets, such a call connection is going to be carried out by a speech path using the LAN. Only when a speech path using the LAN is impossible, is the above-mentioned call connection carried out by a speech path using the speech network.

In the prior art communication system, however, after the speech path using the speech network is realized, even if a speech path using the LAN can be realized, it is impossible to automatically switch the speech path using the speech network to the speech path using the LAN, which increases the charges.

SUMMARY OF THE INVENTION

It is an object of the present invention to provide a communication system capable of automatically switching a speech path using a speech network to a speech path using a LAN when the speech path using the LAN can be realized.

According to the present invention, in a communication system including a LAN, first and second LAN telephone gateways connected to the LAN, a speech network, first and second PBXs connected to the speech network and to the first and second LAN telephone gateways, respectively, and first and second telephone sets connected to the first and second PBXs, respectively, a first speech path is realized from the first telephone set via the first PBX to the first LAN telephone gateway. Then, it is determined whether a second speech path from the first LAN telephone gateway via the LAN, the second LAN telephone network, and the second PBX to the second telephone set is possible or impossible. Then, after the second speech path is determined to be possible, the second speech path is realized. After the second speech path is determined to be impossible, a third speech path is realized from the first LAN telephone gateway via the first PBX, the speech network and the second PBX to the second telephone set. When the third speech path is realized, it is determined whether or not a fourth speech path from the first LAN telephone gateway via the LAN and the second LAN telephone gateway to the second PBX is possible. If the fourth speech path is determined to be possible, the fourth speech path is realized and a part of the third speech path from the first LAN telephone gateway via the first PBX and said speech network to the second PBX is disconnected.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENT

Figure 1:
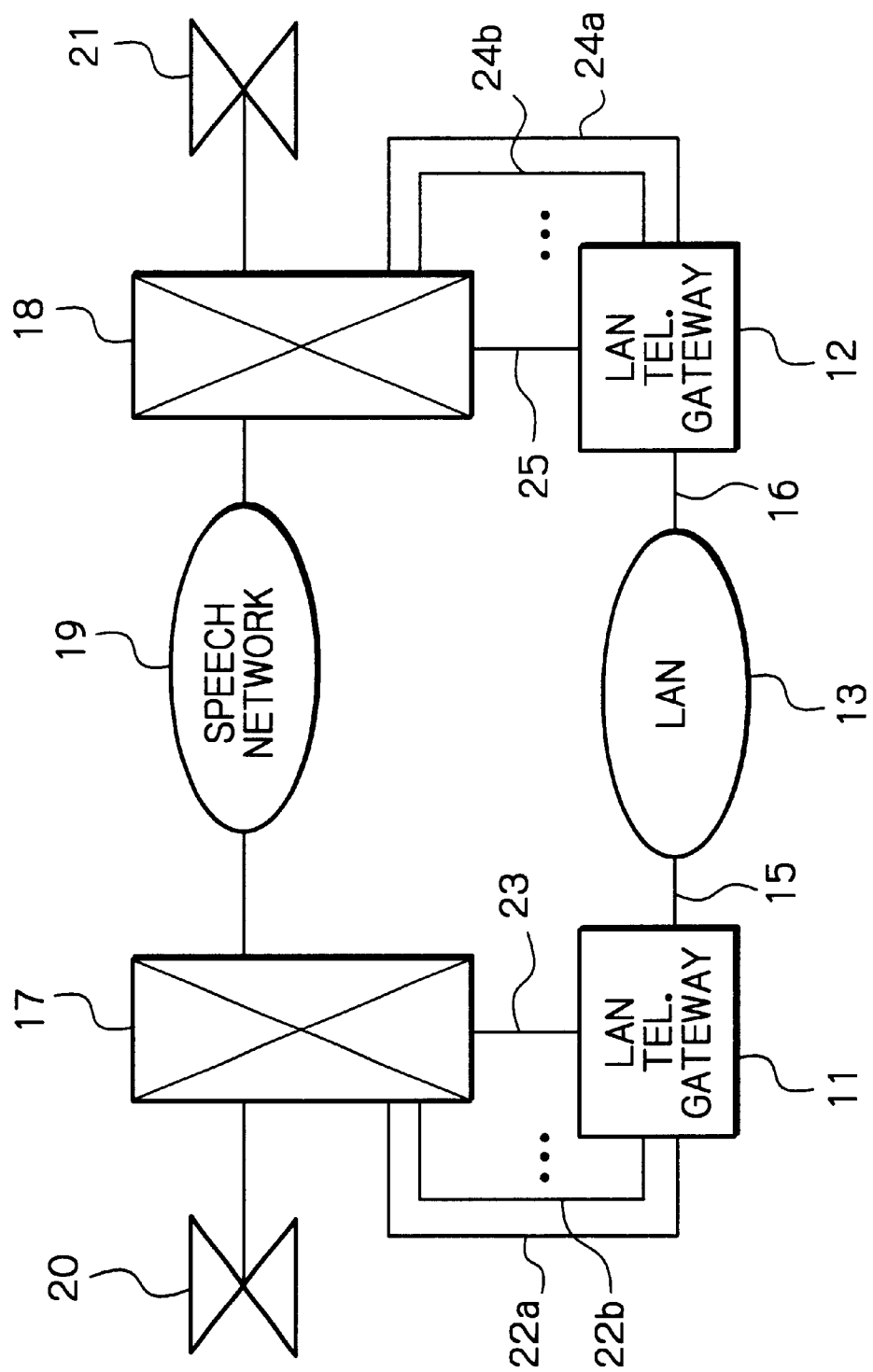
FIG. 1 is a block circuit diagram illustrating an embodiment of the communication system according to the present invention.

In FIG. 1, which illustrates an embodiment of the communication system according to the present invention, LAN telephone gateways 11 and 12 are connected to a LAN 13 by LAN data lines 15 and 16, respectively. The LAN telephone gateways 11 and 12 can communicate with each other by converting speech signals into speech packets which are transmitted over the LAN data lines 15 and 16 through the LAN 13.

PBXs 17 and 18 are connected by a speech network 19 which is a public network, for example. The PBXs 17 and 18 can also communicate with each other by transmitting and receiving speech signals through the speech network 19. Also, a telephone set 20 is connected directly to the PBX 17, and a telephone set 21 is connected directly to the PBX 18. In this case, if the PBX 17(18) can access the telephone set 20(21), it is unnecessary for the telephone set 20(21) to be directly connected to the PBX 17(18).

The LAN telephone gateway 11 is connected to the PBX 17 by speech lines 22a, 22b, . . . , and a data line 23 for receiving and transmitting connection information therebetween. Similarly, the LAN telephone gateway 12 is connected to the PBX 18 by speech lines 24a, 24b, . . . , and a data line 25 for receiving and transmitting connection information therebetween. Therefore, the LAN telephone gateway 11(12) controls the number of speech lines connected between the LAN telephone gateway 11(12) and the PBX 17(18) and supervises the number of calls through the LAN telephone gate 11(12).

A normal operation of the communication system of FIG. 1 is explained next with reference to FIG. 2, where the telephone set 20 is a calling party and the telephone set 21 is a called party.

Figure 2:
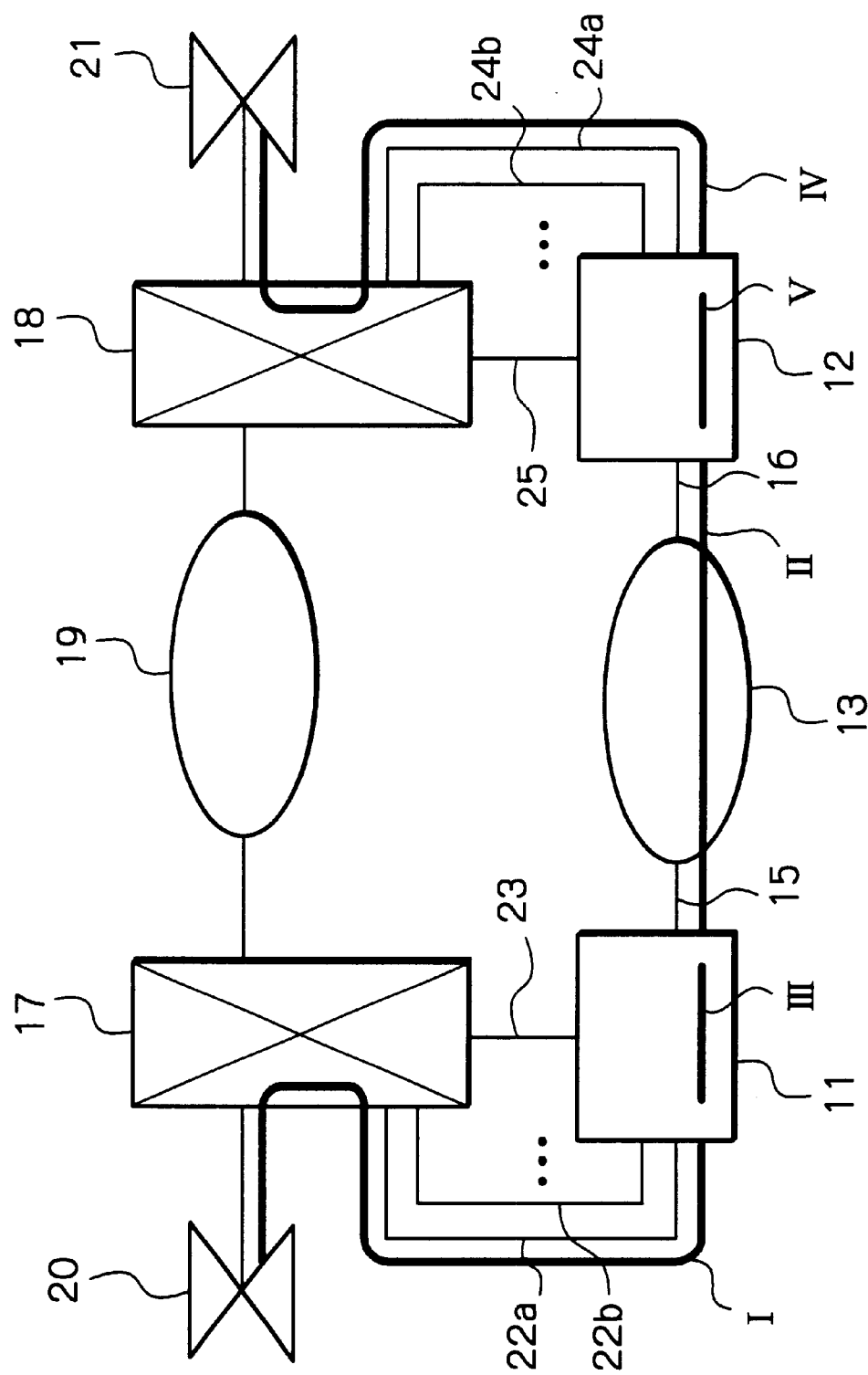
FIG. 2 is a diagram for explaining a normal operation of the system of FIG. 1.

First, as indicated by I in FIG. 2, the PBX 17 connects the telephone set 20 to the LAN telephone gateway 11 by the speech line 22a.

Next, as indicated by II in FIG. 2, the LAN telephone gateway 11 communicates with the LAN telephone gateway 12 to determine whether or not the LAN telephone gateway 11 can communicate with the LAN telephone gateway 12. In this case, since the LAN telephone gateway 12 can communicate with the LAN telephone gateway 11, the LAN telephone gateway 12 sends an acknowledgement signal to the LAN telephone gateway 11.

Finally, as indicated by III in FIG. 2, the LAN telephone gateway 11 realizes a speech path between the speech line 22a and the LAN data line 15. Simultaneously, the LAN telephone gateway 12 sends a request to the PBX 18 via the control line 25 for the PBX 18 to be connected to the LAN telephone gateway 12. As a result, as indicated by IV in FIG. 2, the LAN telephone gateway 12 is connected by the speech line 24a to the PBX 18 which is further connected to the telephone set 21. In addition, as indicated by V in FIG. 2, the LAN telephone gateway 12 realizes a speech path between the LAN data line 16 and the speech line 24a.

Thus, a connection route from the telephone set 20 via the PBX 17, the speech line 22a, the LAN telephone gateway 11, the LAN data line 15, the LAN 13, the data line 16, the LAN telephone gateway 12, the speech line 24a and the PBX 18 to the telephone set 21 is obtained.

An abnormal operation of the communication system of FIG. 1 is explained next with reference to FIGS. 3A, where the telephone set 20 is a calling party and the telephone set 21 is a called party.

Figure 3A:
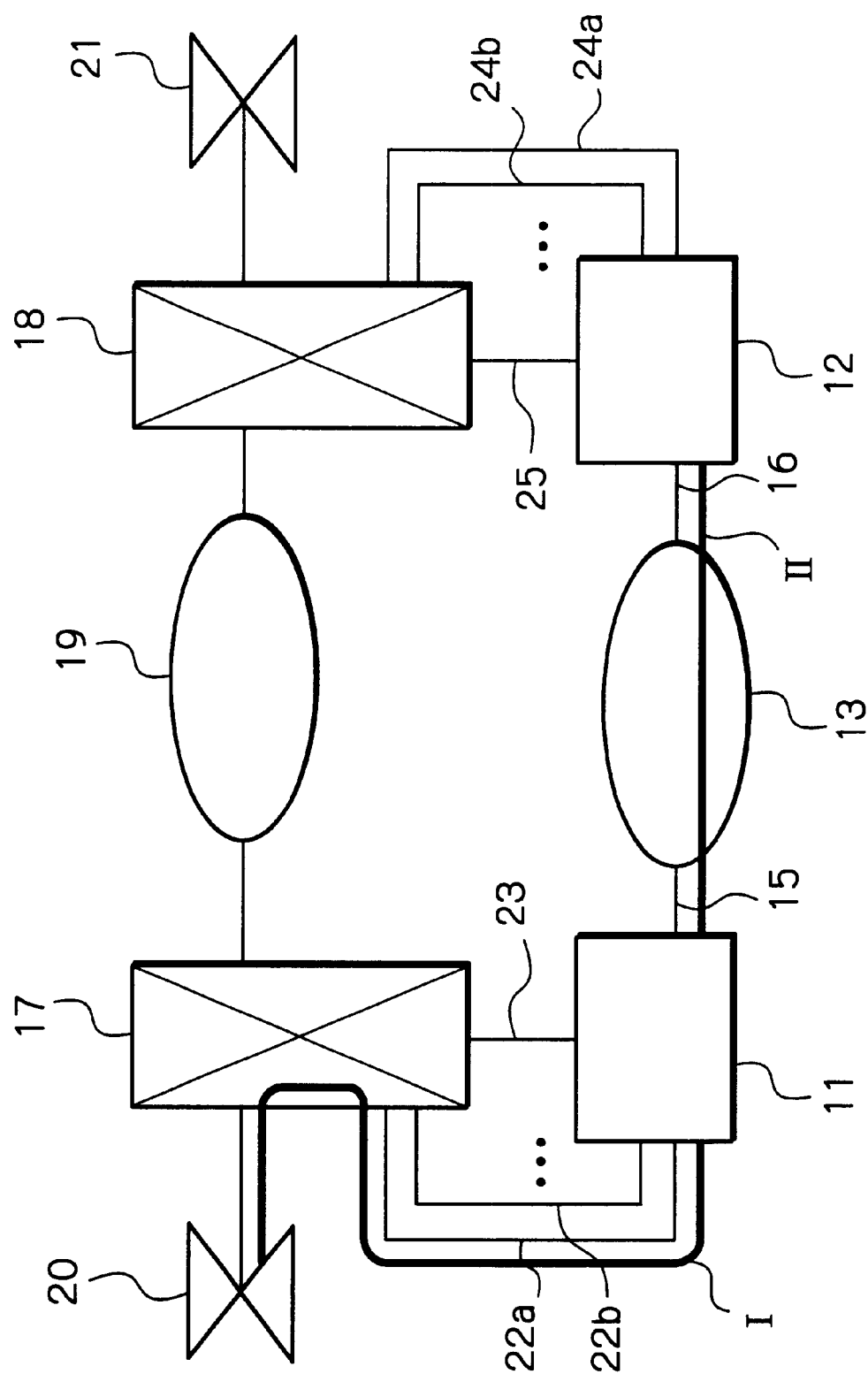
FIGS. 3A, 3B and 3C are diagrams for explaining an abnormal normal operation of the system of FIG. 1.

First, as indicated by I in FIG. 3A, the PBX 17 connects the telephone set 20 to the LAN telephone gateway 11 by the speech line 22a.

Next, as indicated by II in FIG. 3A, the LAN telephone gateway 11 communicates with the LAN telephone gateway 12 to determine whether or not the LAN telephone gateway 12 can communicate with the LAN telephone gateway 11. In this case, since the LAN telephone gateway 12 cannot communicate with the LAN telephone gateway 11 due to the absence of available speech lines between the LAN telephone gateway 12 and the PBX 18 or due to the incomplete communication through the LAN 13, the LAN telephone gateway 12 generates a non-acknowledgement signal or the LAN telephone gateway 12 does not generate an acknowledgement signal.

Figure 3B:
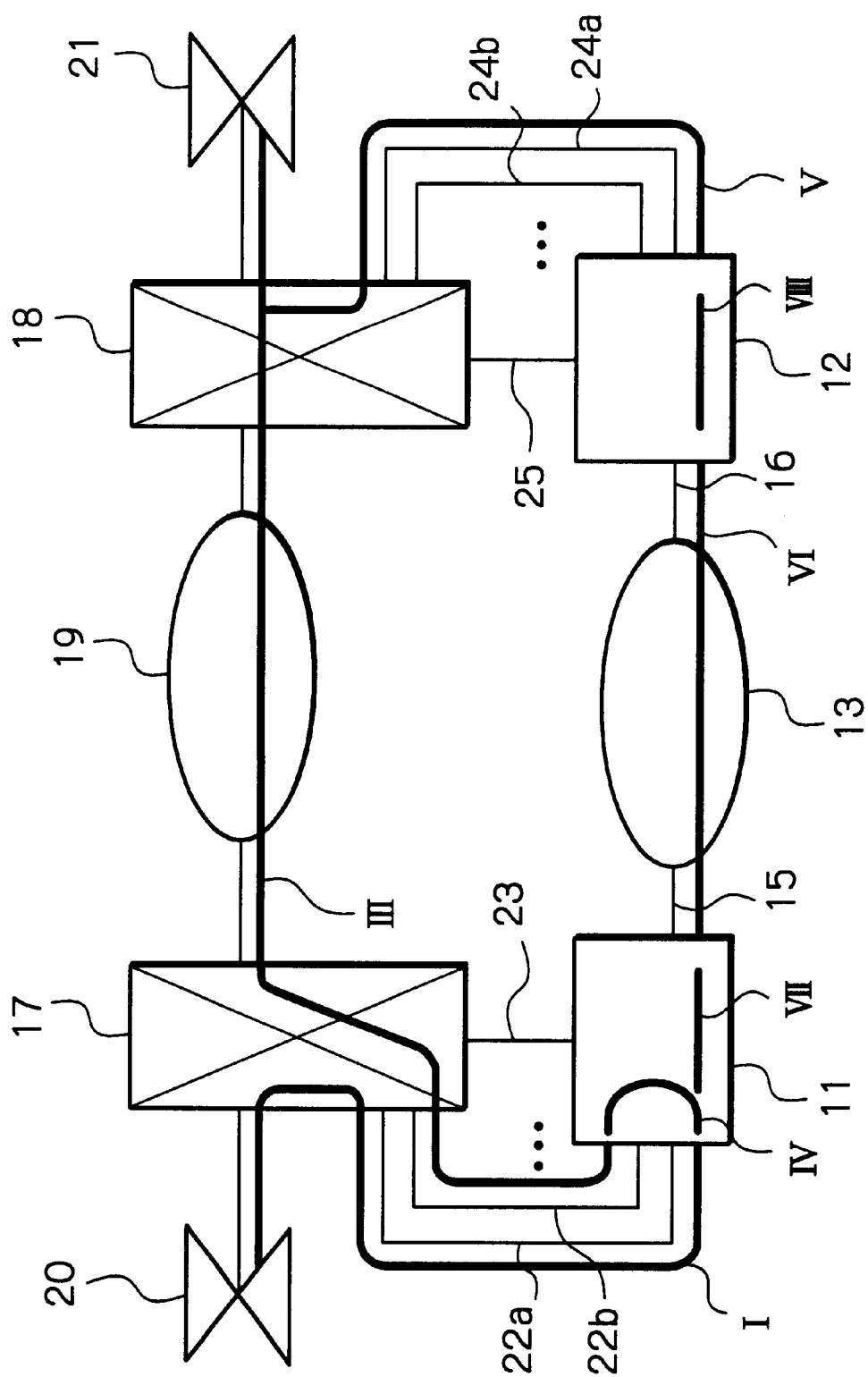

Next, as indicated by III in FIG. 3B, the LAN telephone gateway 11 sends a request to the PBX 17, via the data line 23, for the PBX 17 to be connected to the LAN telephone gateway 11 by another speech line. As a result, the LAN telephone gateway 11 is connected by the speech line 22b to the PBX 17 and is further connected via the speech network 19 and the PBX 18 to the telephone set 21. Simultaneously, as indicated by IV in FIG. 3B, the LAN telephone gateway 11 realizes a speech path between the speech lines 22a and 22b.

Thus, a connection route from the telephone set 20 via the PBX 17, the speech line 22a, the LAN telephone gateway it, the speech line 22b, the PBX 17, the speech network 19 and the PBX 18 to the telephone network 21 is obtained.

In the above-mentioned state as shown in FIG. 3B, when the LAN telephone gateway 12 can communicate with the LAN telephone gateway 11, the LAN telephone gateway 12 sends a request to the PBX 18, via the data line 23, for the PBX 18 to be connected to the LAN telephone gateway 12 by one speech line such as 24a. In this case, the PBX 18(17) has a three-way calling system. Therefore, as indicated by V in FIG. 3B, the LAN telephone gate 12 is connected by the speech line 24a to the PBX 18.

Next, as indicated by VI in FIG. 3B, the LAN telephone gateway 12 realizes a speech path through the LAN 13 to the LAN telephone gateway 11 by using the international telecommunication Union-Telecommunication (ITU-T) Standard Sector H323 protocol or the like.

Next, as indicated by VI in FIG. 3B, the LAN telephone gateway 11 realizes a speech path between the speech line 22a and the LAN data line 15. Simultaneously, as indicated by VIII in FIG. 3B, the LAN telephone gateway 12 realizes a speech path between the speech line 24a and the LAN data line 16.

Figure 3C:
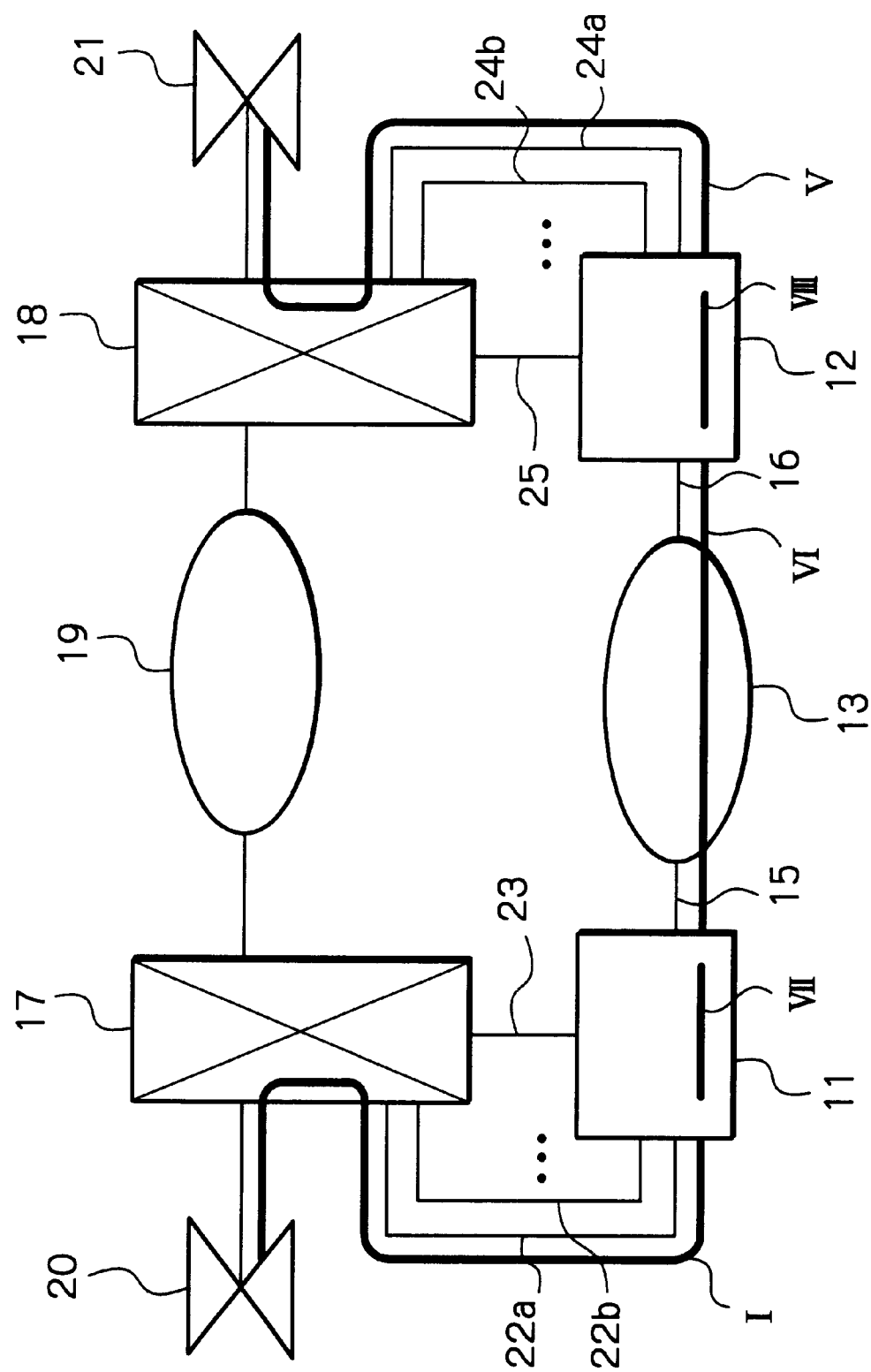

Finally, as shown in FIG. 3C, the connection from the LAN telephone 11 via the speech line 22b, the PBX 17 and the speech network 19 to the PBX 18 is disconnected. Also, the speech path in the LAN telephone network 11 between the speech lines 22a and 22b is dissolved.

Thus, a connection route from the telephone set 20 via the PBX 17, the speech line 22a, the LAN telephone gateway 11, the LAN data line 15, the LAN 13, the data line 16, the LAN telephone gateway 12, the speech line 24a and the PBX 18 to the telephone set 21 is obtained.

In the above-mentioned embodiment, the connection route between the LAN telephone network 11 and the PBX 18 via the speech network 19 is disconnected after the connection route between the LAN telephone network 11 and the PBX 18 via the LAN 13 is realized. However, the disconnection of the former connection route can be carried out simultaneously with the realization of the latter connection route.

Also, three or more LAN telephone gateways can be connected to the LAN 13.

As explained hereinabove, according to the present invention, a speech connection route via a speech network requiring a high charge can be automatically switched to a speech connection route via a LAN requiring a low charge, after the latter connection route is recovered.

What is claimed is:

1. A communication system comprising:

a local area network (LAN);

first and second LAN telephone gateways connected to said LAN;

a speech network;

first and second private branch exchanges (PBXs) connected to said speech network, said first and second PBXs being connected to said first and second LAN telephone gateways, respectively;

first and second telephone sets connected to said first and second PBXs, respectively;

means for realizing a first speech path from said first telephone set via said first PBX to said first LAN telephone gateway;

means for determining whether a second speech path from said first LAN telephone gateway via said LAN, said second LAN telephone gateway and said second PBX to said second telephone set is possible or impossible, after said first speech path is realized;

means for realizing said second speech path, after said second speech path is determined to be possible;

means for realizing a third speech path from said first LAN telephone gateway via said first PBX, said speech network and said second PBX to said second telephone set, after said second speech path is determined to be impossible;

means for determining whether or not a fourth speech path from said first LAN telephone gateway via said LAN and said second LAN telephone gateway to said second PBX is possible by using a three-way calling system in said second PBX, when said third speech path is realized;

means for realizing said fourth speech path, after said fourth speech path is determined to be possible; and means for disconnecting a part of said third speech path from said first LAN telephone gateway via said first PBX and said speech network to said second PBX, after said fourth speech path is realized.

2. The system as set forth in claim 1, wherein said speech network comprises a public network.

3. The system as set forth in claim 1, wherein said LAN telephone gateway converts speech signals to packets for said LAN and converts packets from said LAN into speech signals.

4. A communication system comprising:

a local area network (LAN);

first and second LAN telephone gateways connected to said LAN;

a speech network;

first and second three-way calling type private branch exchanges (PBXs) connected to said speech network, said first PBX being connected by a plurality of first speech lines and a first data line to said first LAN telephone gateway, said second PBX being connected by a plurality of second speech lines and a second data line to said second LAN telephone gateway;

first and second telephone sets connected to said first and second PBXs, respectively;

means for realizing a first speech path from said first telephone set via said first PBX and one of said first speech lines to said first LAN telephone gateway;

means for determining whether a second speech path from said first LAN telephone gateway via said LAN, said second LAN telephone gateway, one of said second speech lines and said second PBX to said second telephone set is possible or impossible, after said first speech is realized; means for realizing said second speech path, after said second speech path is determined to be possible;

means for realizing a third speech path from said first LAN telephone gateway via another of said first speech lines, said first PBX, said speech network and said second PBX to said second telephone set, after said second speech path is determined to be impossible;

means for determining whether or not a fourth speech path from said first LAN telephone gateway via said LAN and said second LAN telephone gateway and one of said second speech lines to said second PBX is possible by using a three-way calling function in said second PBX, when said third speech path is realized;

means for realizing said fourth speech path, after said fourth speech path is determined to be possible; and means for disconnecting a part of said third speech path from said first LAN telephone gateway via said other of said first speech lines, said first PBX and said speech network to said second PBX, after said fourth speech path is realized.

5. The system as set forth in claim 4, wherein said speech network comprises a public network.

6. The system as set forth in claim 4, wherein said LAN telephone gateway converts speech signals to packets for said LAN and converts packets from said LAN into speech signals.

7. A method for realizing a speech part in a communication system including: a local area network (LAN); first and second LAN telephone gateways connected to said LAN; a speech network; first and second private branch exchanges (PBXs) connected to said speech network, said first and second PBXs being connected to said first and second LAN telephone gateways, respectively; and first and second telephone sets connected to said first and second PBXs, respectively, said method comprising the steps of:

realizing a first speech path from said first telephone set via said first PBX to said first LAN telephone gateway;

determining whether a second speech path from said first LAN telephone gateway via said LAN, said second LAN telephone gateway and said second PBX to said second telephone set is possible or impossible, after said first speech path is realized;

realizing said second speech path, after said second speech path is determined to be possible;

realizing a third speech path from said first LAN telephone gateway via said first PBX, said speech network and said second PBX to said second telephone set, after said second speech path is determined to be impossible;

determining whether or not a fourth speech path from said first LAN telephone gateway via said LAN and said second LAN telephone gateway to said second PBX is possible by using a three-way calling system in said second PBX, when said third speech path is realized;

realizing said fourth speech path, after said fourth speech path is determined to be possible; and disconnecting a part of said third speech path from said first LAN telephone gateway via said first PBX and said speech network to said second PBX, after said fourth speech path is realized.

8. The method as set forth in claim 7, wherein said speech network comprises a public network.

9. The method as set forth in claim 10, wherein said LAN telephone gateway converts speech signals to packets for said LAN and converts packets from said LAN into speech signals.

* * * * *